June 21, 1949.  L. ZIMMERMANN  2,474,138
WORK REST AND METHOD OF FORMING THE SAME
Filed Aug. 31, 1945
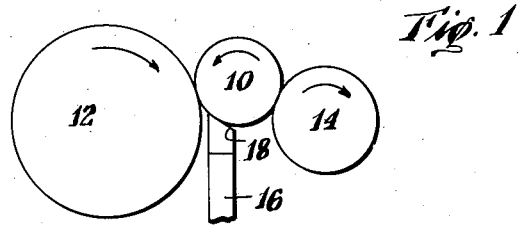
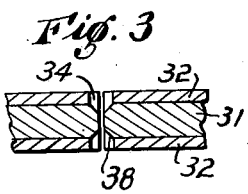
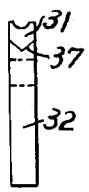
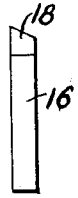
INVENTOR
Lukas Zimmermann
BY
ATTORNEYS Patented June 21, 1949

2,474,138

UNITED STATES PATENT OFFICE 2,474,138

WORK REST AND METHOD OF FORMING THE SAME

Lukas Zimmermann, Birmingham, Mich.

Application August 31, 1945, Serial No. 613,823

12 Claims. (Cl. 51—238)

This invention relates to work rests for centerless grinders, and has for an object to provide an improved work rest for supporting work pieces during the grinding operation.

One of the problems incident to the manufacture of articles by centerless grinding has been to provide work rests with top portions or tips of sufficiently hard material, such as cemented tungsten carbides, to withstand rapid wear from abrasion. It has been customary to braze the cemented carbide tips to the upper portion of the work rest, which is generally of steel. Because of the differences in coefficients of thermal expansion of cemented carbide and steel, trouble has been encountered in brazing the carbide tips to steel. To partially overcome this trouble the carbide tips have been generally limited to a maximum length of approximately two inches. Work rests, however, are often of a 24 inch length or more and it is, therefore, necessary to braze a number of these tips to the blade. Also, further trouble is experienced as a result of the brazing operation in that the finished blades warp into a bowed configuration, necessitating a subsequent truing operation by expensive diamond-charged grinding wheels with additional loss accruing in view of the costly carbide material that is removed during the grinding operation.

It is, therefore, another object of the invention to provide a work rest that may be readily manufactured in a more economical manner.

Still another object of the invention is to provide an improved work rest having a substantially true upper surface.

A further object of the invention is to fuse carbide tips to a work rest blade without substantially distorting the aligned surface thereof.

A still further object of the invention is to provide an improved arrangement and method for fusing two materials of substantially different thermal coefficients of expansion together.

In accordance with one embodiment of the invention, improvements in manufacture are obtained over the prior arrangements by providing the steel or other metallic blade of a work rest with inverted T-shaped notches spaced longitudinally along the upper surface thereof and brazing tips of hardened material to the blade between the notches, while a substantial portion of the blade is preferably disposed in a cooling medium, the T-shaped notches being adapted to reduce thermal conductivity from the metallic body adjacent the heated tips to the main portion of the blade, whereby bowing of the blade is substantially prevented.

This and other features of the invention will be more fully described in the following specification taken in connection with the accompanying drawings in which:

Fig. 1 illustrates schematically a typical centerless grinding arrangement;

Fig. 2 is a front view of a work rest manufactured in accordance with the present invention;

Fig. 3 is a sectional view taken along line 7—7 of Fig. 6;

Fig. 4 is an end view of the blade shown in Fig. 6; and

Fig. 5 is an end view of a typical work rest with angular top face.

Referring now to the drawings, particularly to Fig. 1, there is shown schematically a centerless grinder in which a work piece 10 is disposed between a grinding wheel 12 and a regulating wheel 14 and upon a work rest 16 having an angular resting surface or tip 18 (shown more clearly in Fig. 5). It is apparent that during centerless grinding operations, as the work piece 10 rotates it carries with it particles of abrasive material from the grinding wheel 12 and these particles tend to wear the tip 18 of the work rest 16. It is, therefore, necessary that the tips 18 be made of a hardened material to prevent rapid wear by abrasion. However, as mentioned hereinbefore, there are some difficulties connected with brazing cemented carbide tips on steel, mainly because of the difference between the coefficients of thermal expansion of the two metals. It is this difference which limits the size of carbide tips generally used to a maximum length of about two inches. Inasmuch as work rests for centerless grinders are often of a length of 24 inches or more, it becomes necessary, in order to protect the entire length, to use a number of tips brazed to the edge of a work rest blade.

While the above procedure is satisfactory to a certain degree, it has been found that the work rest blades tend to warp as a result of the brazing operation, whereupon it is necessary to true the surface of the tips 18 by an expensive diamond grinding operation. It is readily apparent that further expense results from the waste of the removed hardened tip material by the truing operation.

Referring now to the drawings there is shown an improved work rest 30 in which applicant has eliminated the above-described faults. Work rest 30 includes a plurality of hardened tips 31, such as cemented tungsten carbide, connected to a blade 32 in which the upper portion, such as a third thereof, is formed with a plurality of inverted T-notches or T-slots 33 comprising a narrow notch 34 and an elongated slot 35. This portion of the blade 32 is, therefore, divided into a plurality of T-shaped segments 36, which are spaced to correspond substantially with the length of the tips 31, and are connected to the body of the blade by spaced necks 37. The blade 32 is further formed with V-shaped grooves 37 for receiving the complementarily-shaped tips 31. Care is taken that the tips 31, while being brazed to the blade 32, will not be brazed to each other. Assurance of this is obtained by providing a slight space or gap between adjacent tips 31. In order to prevent brazing material from reaching the ends of the carbide tips 31, from where it would flow between the tips by capillary action, the bottom edges thereof are provided with chamfered corners 38 (Fig. 3) and the slots 34 between the segments 36 are made wide enough to allow any surplus brazing material to run off without bridging the gaps. In the embodiment shown in Figs. 2 and 4, the upper arcuate cross-section of the tip 31 was provided with a groove having a .252 radius. Occasionally, however, the tips are provided with an angular upper surface, as shown in Fig. 4.

During the brazing operation, the blade 32 is preferably first submerged in a cooling medium, such as water, to line A—A. Then the tips 31 are brazed in place one at a time, beginning at one end of the blade 32 and moving towards the other end. Since the solid bottom portion of the blade is kept cool, it will not expand. The T-shaped segments 36 are free to expand endwise and up without causing any trouble. The tips 31 cannot interfere with each other, because each tip, while being brazed, is in the maximum expanded condition. If a heated tip should touch a previously brazed tip, it will break contact after cooling, since the spacing from center to center of the segments 36 will not change, as the main portion of the blade is submerged in water.

It is thus readily seen that an improved and straight work rest may be economically manufactured in accordance with applicant's invention.

While brazing torches have been referred to above as the source of heat for brazing, it is, of course, to be understood that other heating means may be used, such as high frequency induction heating.

It is also to be understood that while the invention has been illustrated and described as especially useful in the attachment of cemented carbide tips to work rests, the invention may also be utilized in certain other applications where materials having different coefficients of thermal expansion must be fused together.

While this invention has been shown and described as embodying certain features merely for the purpose of illustration, it is, of course, understood that various modifications may be made in the details thereof without departing from the scope of the invention, as defined in the appended claims.

What is claimed is:

1. In a work rest, the combination with a plurality of hardened tip elements of a blade having a plurality of spaced segments along one edge thereof, said tip elements being respectively fused to said blade segments.

2. In a work rest, the combination with a plurality of hardened tip elements of a blade having a plurality of spaced T-shaped segments along one edge thereof, said tip elements being respectively fused to said blade segments.

3. A work rest comprising, in combination, a blade and a plurality of hardened tip elements having a coefficient of thermal expansion substantially different from that of the blade brazed to said blade, said blade having spaced inverted T-notches adjacent said elements for reducing thermal conductivity at the joints formed between the tip elements and the blade.

4. A work rest for use in centerless grinding machines comprising, in combination, a metallic blade provided with a plurality of inverted T-notches at one edge for reducing thermal conductivity, and a plurality of cemented carbide elements brazed to said edge, said elements having chamfers at their inner corners for preventing brazing material from entering between adjacent tip elements.

5. In a work rest adapted for supporting a work piece in a centerless grinding machine, the combination of a metallic body having a V-shaped groove extending along one edge thereof with a plurality of cemented carbide tips disposed in said groove and fused to said body, said blade also having a plurality of elongated apertures for reducing thermal conductivity of said blade and for permitting expansion and contraction thereof.

6. In a work rest adapted for supporting a work piece in a centerless grinding machine, the combination of a metallic body having a V-shaped groove extending along one edge thereof with a plurality of tungsten carbide tips disposed in said groove and brazed to said body, said blade also having a plurality of elongated apertures and T-shaped segments for reducing thermal conductivity of said blade and for permitting expansion and contraction of said segments.

7. A blade for a work rest having one edge thereof provided with at least a pair of inverted T-notches and a T-shaped segment formed therebetween for reducing thermal conductivity and for permitting temporary expansion of said segment.

8. The method of fusing a plurality of elements having one coefficient of thermal expansion to a member having a substantially different coefficient of expansion without distorting the surface of the fused assembly which consists in providing a plurality of spaced notches of substantial depth along an edge of the member adjacent to the joints formed between adjacent elements so that said edge is connected to the body of said member by a plurality of spaced necks, and fusing the elements step by step to said neck.

9. The method of fusing a plurality of hardened tip elements to a metallic blade without bowing the surface of the composite assembly which consists in providing a plurality of spaced inverted T-slots along an edge of the blade adjacent to the joints formed between adjacent tip elements whereby said edge comprises separate sections connected to the body portion of the blade by spaced necks, and separately brazing the tip elements to said sections of the blade edge.

10. The method of manufacturing a composite work rest blade which consists in forming the body of the blade with a plurality of inverted T-notches disposed along one edge thereof whereby said edge comprises separate sections connected to the body portion of the blade by spaced necks, placing separate tungsten carbide tips on the spaced sections of said edge, maintaining the unnotched portion of the blade in a cooling medium, and brazing the tips to said sections of the blade edge.

11. In the process of forming a work rest, including a blade and a plurality of hardened tip elements, forming inverted T-notches at predetermined points along one edge of the blade whereby said edge comprises separate sections connected to the body portion of the blade by spaced necks, placing the tip elements on said edge of the blade so that the spaces between adjacent tip elements are at the notches, cooling the unnotched lower portion of said blade, and individually brazing the tip elements without fusing adjacent elements together.

12. In the process of forming a work rest, including a blade and a plurality of hardened tip elements, forming a transverse V-notch longitudinally along one edge of the blade, forming spaced T-shaped sections along said edge of the blade, placing a separate tip element on each of said sections, maintaining the unnotched portion of said blade in a cooling medium, and brazing each of the tip elements to its associated segment without fusing adjacent elements together.

LUKAS ZIMMERMANN.

REFERENCES CITED

The following references are of record in the file of this patent:

UNITED STATES PATENTS

| Number | Name | Date |
| --- | --- | --- |
| 1,342,717 | Lipps | June 8, 1920 |
| 1,615,591 | Mallory | Jan. 25, 1927 |
| 1,691,061 | Heim | Nov. 13, 1928 |
| 1,837,344 | Stauder | Dec. 22, 1931 |
| 2,034,418 | Plant | Mar. 17, 1936 |
| 2,064,407 | Bird | Dec. 15, 1936 |